(No Model.)

T. T. WOOD.
LAWN MOWER.

No. 468,075. Patented Feb. 2, 1892.

Witnesses

Inventor
Thos. T. Wood
By his Attorney
Chas. J. Gooch

UNITED STATES PATENT OFFICE.

THOMAS T. WOOD, OF PARKSIDE, ASSIGNOR OF ONE-FOURTH TO GRANVILLE E. HARRIS, OF CHICAGO, ILLINOIS.

LAWN-MOWER.

SPECIFICATION forming part of Letters Patent No. 468,075, dated February 2, 1892.

Application filed April 1, 1891. Serial No. 387,298. (No model.)

*To all whom it may concern:*

Be it known that I, THOMAS T. WOOD, a citizen of the United States, residing at Parkside, in the county of Cook and State of Illinois, have invented certain new and useful Improvements in Lawn-Mowers; and I do hereby declare the following to be a full, clear, and exact description of the invention, such as will enable others skilled in the art to which it appertains to make and use the same.

My invention relates to certain improvements in lawn-mowers, as hereinafter described and claimed.

Figure 1:
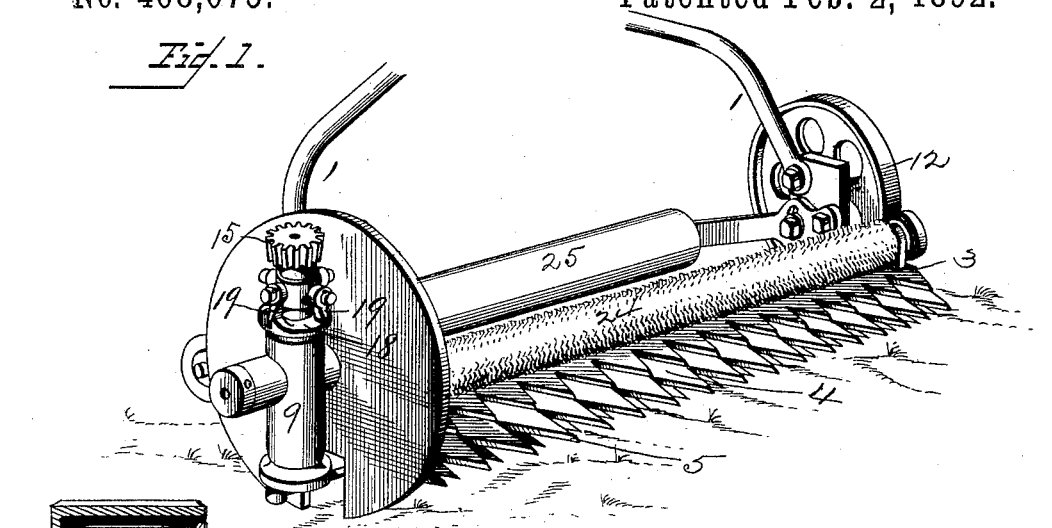
Figure 2:
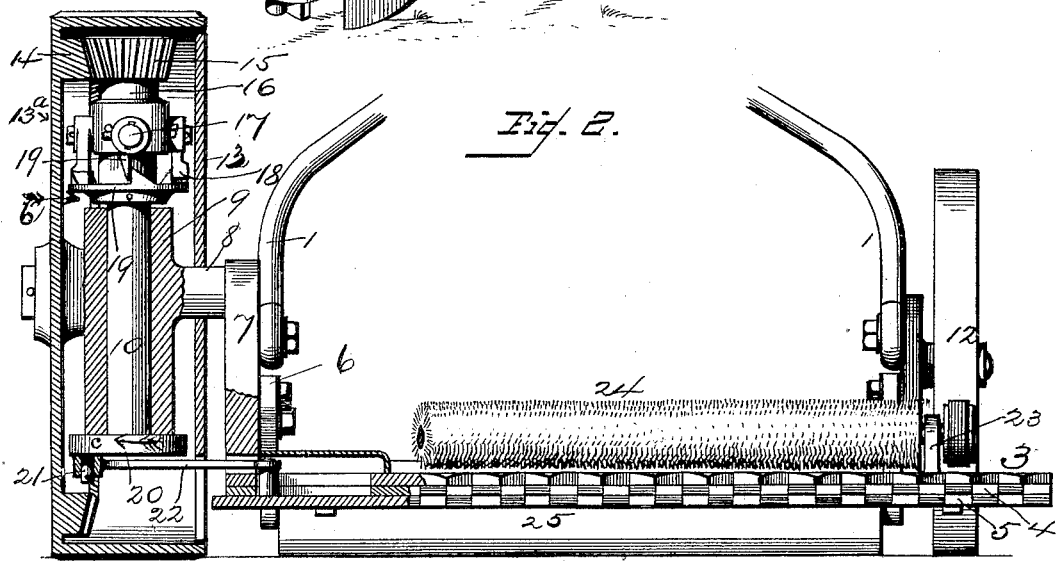
Figure 3:
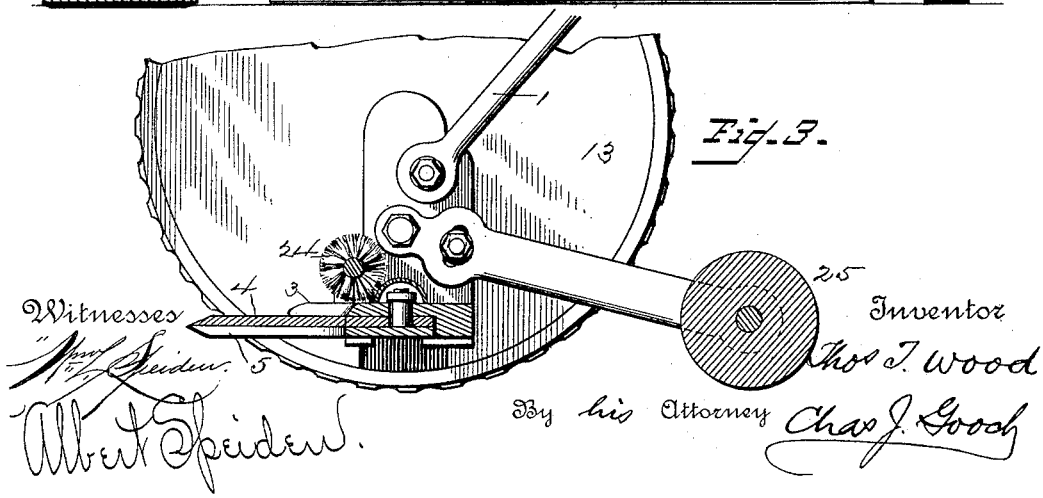

In the accompanying drawings, Figure 1 represents a perspective view of my improved lawn-mower with a portion of the driving-wheel inclosing the actuating mechanism removed. Fig. 2 represents a sectional front elevation. Fig. 3 represents a partly sectional detail view to an enlarged scale.

In that class of lawn-mowers where rotary knives are employed for cutting the grass the grass is beaten down by the knives in the operation of cutting and a close or even cut thereby rendered unattainable unless the mower is run over each portion several times, and where the grass is somewhat high it is also necessary in that class of machines to first employ either a scythe or a sickle before such mower can be profitably employed. Another objection found in the use of lawn-mowers of ordinary construction is that as the mower is drawn back for a recut the operating parts and the knives rotate rearwardly, thereby causing not only unnecessary noise, but also injurious and unprofitable wear and tear of the parts. By my improvements I overcome these objections and produce a lawn-mower which will closely and evenly cut grass of any height by a single continuous movement therethrough of the mower without the necessity of the user retracing his steps to trim jagged places or to recut down to the desired level, and I am also enabled to cut close to a wall or sidewalk and evenly trim edges.

1 represents the bars or rods connecting the handle and frame. 3 represents a finger-bar, and 4 a rigid sickle-bar bolted or otherwise secured thereto, while 5 represents the reciprocating sickle-bar or knife located under and sliding along the under face of the upper bar 4. The driving-wheel end of the frame 6 is constructed with an upward-extending side piece 7, having at its top an outward horizontal extension 8, terminating in a tubular vertical hub 9, within which the operating-shaft 10 is located, a journal extending horizontally outward from said hub to support the driving-wheel and frame.

12 represents a wheel, on which the other end of the frame is supported.

The driving-wheel 13ª is provided, as shown, on its inner face with a circumferential set of spur-teeth 14, which engage with a pinion 15, carried by a sleeve 16, loosely mounted on the top of the shaft 10. From the sides of this sleeve 16 radially extend pins or bars 17, on which are carried pivotal dogs 18, which depend therefrom to a ratchet-wheel 19, keyed or otherwise secured to the shaft 10 at the top of the hub 9. As the mower is projected in a forward direction the forward rotation of the driving-wheel rotates the pinion 15, and consequently the sleeve 16, connected therewith, and also the dogs or catches 18, in the direction of the arrow *b*, whereupon said dogs will engage the teeth of the ratchet-wheel 19 and cause the shaft 10 to rotate, which as it so rotates will rotate a crank-plate 20, keyed or otherwise secured to the bottom of said shaft. To this crank-plate is attached by means of a pin 21, projecting therefrom, a rod 22, whose other end is connected with the horizontally-reciprocating sickle-bar. By this arrangement it will readily be observed that as the machine moves in a forward direction the shaft 10 will, through the means just described, be rotated and the grass-cutting mechanism operated. Now when the mower is drawn rearward, the driving-wheel will, through the medium of its spur-teeth, rotate the pinion and its thereto-connected sleeve in the direction indicated by the arrow *c*—that is, in a direction the reverse of that followed when the mower is projected in a forward direction to cut the grass. As a necessary consequence of such reverse rotation of the pinion and sleeve the dogs 18 will be carried around thereby, and, owing to their pivotal character, will then ride over the teeth of the clutch-plate and be inactive to actuate the same and the shaft 10, to which the ratchet-wheel is attached. Thus it will be apparent that as the machine is moved rearward and the pinion 15 and parts connected therewith rotated in the direction of the arrow $c$ the shaft 9 will be out of operative engagement with the actuating mechanism, and consequently the cutting mechanism will be at rest.

23 represent brackets on the frame, within which a brush 24 is journaled to freely rotate during the operation of the machine for the purpose of clearing the sickle-bars of the cuttings.

A roller may be used to regulate the cut or keep the cutter level on irregular ground.

Having thus described my invention, what I claim is—

1. A lawn-mower or grass-cutter consisting of a frame having upward-extending ends and having at its driving-wheel end an outward horizontal extension and a tubular vertical hub, a vertical operating-shaft rotatably located within said vertical hub, a journal for the driving-wheel extending outward from said hub, a supporting-wheel, a drive-wheel having on the inner face of its outer side a circumferential set of spur-teeth, a sleeve loosely mounted on the top of said shaft, a pinion carried by said sleeve and adapted to engage with the spur-teeth on the driving-wheel, dogs pivoted to said sleeve, a ratchet-wheel secured to said shaft to engage said dogs, a crank-plate secured to the lower portion of the rotatable shaft, horizontally-reciprocating and stationary sickle-bars carried by said frame, and a connecting-rod connecting said crank-plate and the reciprocating sickle-bar, substantially as and for the purpose set forth.

2. A lawn-mower or grass-cutter consisting of a frame having at its driving-wheel end a tubular vertical hub and a journal for the drive-wheel, a shaft contained and adapted to rotate within said tubular hub and having at its lower end a crank-plate and at its upper portion a ratchet-wheel, a sleeve loose upon the top of the said shaft and having at its top a pinion and at its lower portion radiating pins carrying pivoted dogs adapted to either engage or ride over said ratchet-wheel as the sleeve is rotated in one direction or the other and thereby either actuate or release the operative shaft from rotation, a drive-wheel having on the inner side face of one of its sides a circumferential series of teeth engaging and rotating said pinion and the thereto-connected sleeve, a horizontally-reciprocating cutter-bar, a rod connecting the clutch-plate and cutter, and a horizontal knife-cleaning brush, substantially as and for the purpose set forth.

3. The improved driving mechanism herein described for the sickle-bars of lawn-mowers, consisting of a drive-wheel journaled in the framing and having on the interior of its outer side face a circumferential set of spur-teeth, a vertical rotary shaft, a horizontal ratchet-wheel secured to the upper portion of said shaft, a sleeve loosely mounted on said shaft, a pinion secured to the upper portion of said sleeve to engage the teeth on the drive-wheel, dogs pivoted to and depending from said sleeve and adapted to either engage with or ride over the teeth of the ratchet-wheel and thereby rotate said ratchet-wheel and the thereto-connected operative shaft when the machine travels forward only, a crank secured to the bottom of the rotary shaft, and a rod connecting said crank and the sickle, all substantially as and for the purpose set forth.

In testimony whereof I affix my signature in presence of two witnesses.

THOMAS T. WOOD.

Witnesses:
T. M. KENNEDY,
I. N. COLBURN.